United States Patent
Shillig

[11] Patent Number: 5,267,501
[45] Date of Patent: Dec. 7, 1993

[54] R/C PAINT BALL DROP SYSTEM

[76] Inventor: Vance R. Shillig, P.O. Box 25932, Colorado Springs, Colo. 80936

[21] Appl. No.: 989,666

[22] Filed: Dec. 14, 1992

[51] Int. Cl.$^5$ .............................................. B64D 1/04
[52] U.S. Cl. ..................................... 89/1.51; 221/277
[58] Field of Search ................. 89/1.51, 1.56, 1.59; 221/277, 287; 273/260

[56] References Cited

U.S. PATENT DOCUMENTS

| | | | |
|---|---|---|---|
| 2,077,896 | 4/1937 | Quick | 221/277 |
| 2,824,665 | 2/1958 | Camouria | 221/277 |
| 2,954,229 | 9/1960 | Schumacher et al. | 89/1.51 |
| 3,225,490 | 12/1965 | Ostrom | 446/405 |
| 3,248,008 | 4/1966 | Meierjohan | 221/277 |
| 3,382,800 | 5/1968 | Biggs, Jr. | 102/369 |
| 3,498,218 | 3/1970 | Myers | 102/369 |
| 3,547,000 | 12/1970 | Haberkorn | 89/1.51 |
| 4,218,064 | 8/1980 | Sobbe | 273/428 |
| 4,424,733 | 1/1984 | Degen | 89/1.51 |
| 4,522,104 | 6/1985 | Degan | 89/1.51 |
| 5,062,543 | 11/1991 | Germain | 221/287 |
| 5,063,823 | 11/1991 | Marshall et al. | 89/1.51 |

Primary Examiner—David H. Brown

[57] ABSTRACT

A paint ball delivery system (10) for incorporation into a radio controlled airplane (100); wherein, the system (10) comprises a housing unit (11) equipped with a magazine member (30) containing paint balls (51) and having an actuating unit (13) which controls the release of the paint balls (51) from the housing unit (11).

6 Claims, 1 Drawing Sheet

U.S. Patent  Dec. 7, 1993  5,267,501
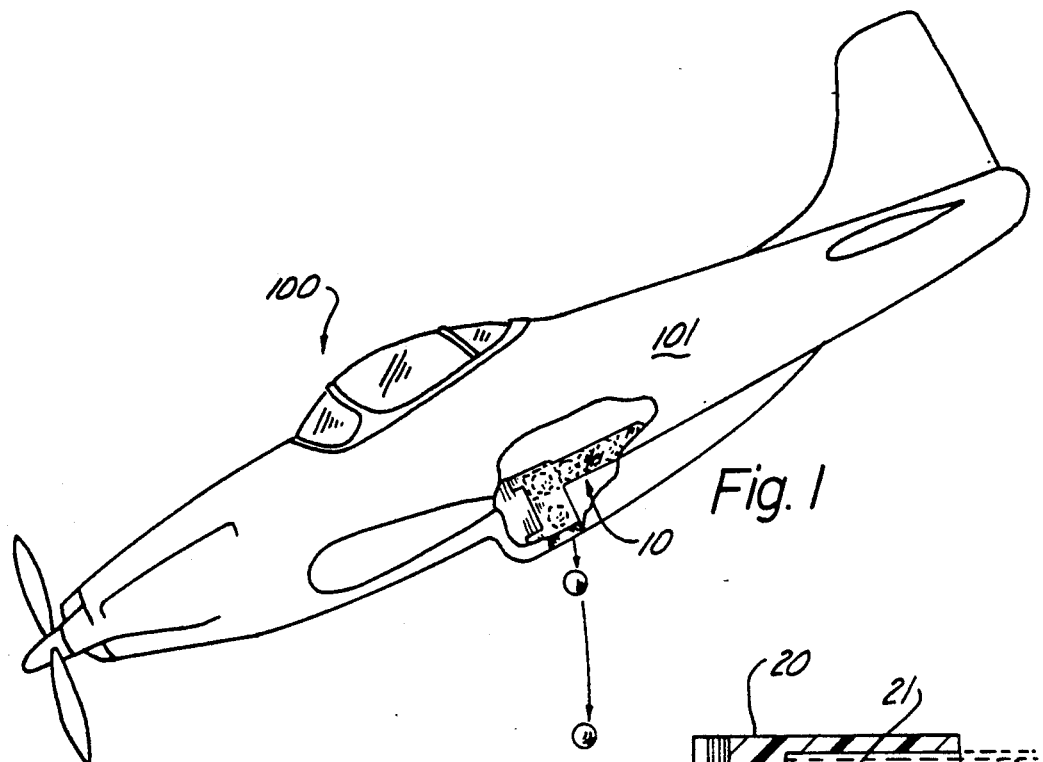
Fig. 1
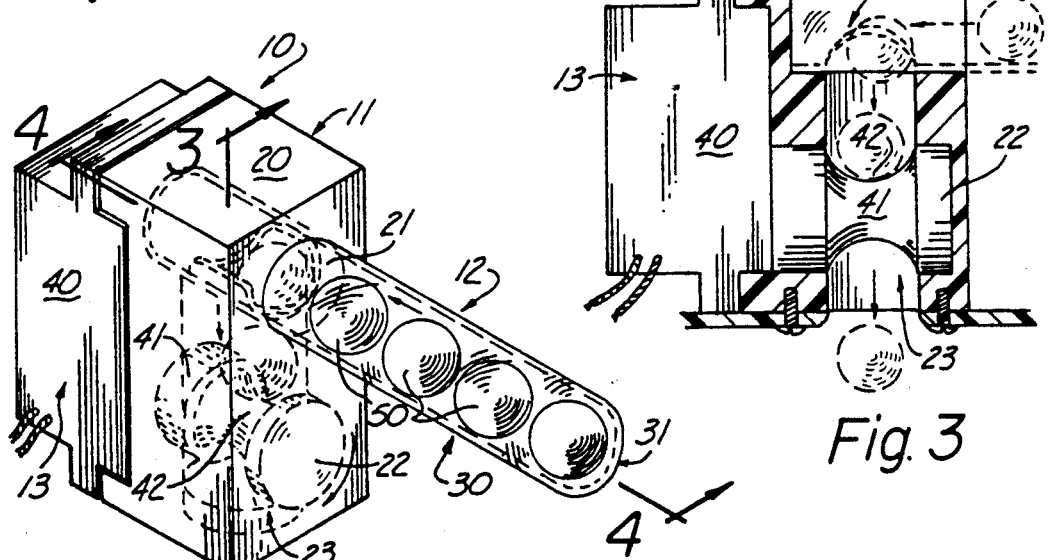
Fig. 3
Fig. 2
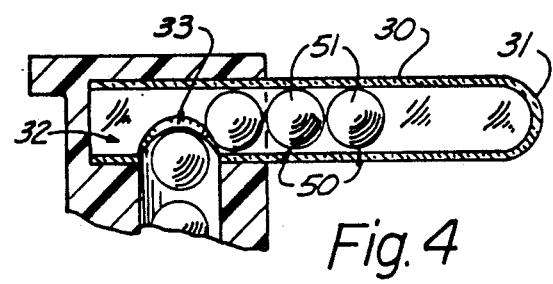
Fig. 4

R/C PAINT BALL DROP SYSTEM

TECHNICAL FIELD

The present invention relates to simulated bomb dropping systems for radio controlled aircraft in general, and in particular to a system for selectively and sequentially delivering paint ball capsules from a radio controlled aircraft.

BACKGROUND ART

This invention was the subject matter of Document Disclosure Program Registration No. 254,999 which was filed in the United States Patent and Trademark Office on Jun. 8, 1990.

As can be seen by reference to the following U.S. Pat. Nos. 4,218,064; 3,382,800; 3,225,490; and 3,498,218; the prior art is replete with myriad and diverse toy projectiles and even means for delivering a projectile from a radio controlled aircraft.

While all of the aforementioned prior art constructions are more than adequate for the basic purpose and function for which they have been specifically designed, these patented devices in general and the Sobbe device in particular neither teach or suggest a method of sequentially and selectively delivering a plurality of simulated bombs from a radio controlled airplane.

As a consequence of the foregoing situation, there has existed a longstanding need among R/C enthusiasts for a new delivery system that can be incorporated into a radio controlled airplane to drop a plurality of different colored simulated bomblets in a sequential fashion; and, the provision of such a construction is a stated objective of the present invention.

DISCLOSURE OF THE INVENTION

Briefly stated, the paint ball drop system that forms the basis of the present invention comprises a housing unit equipped with a bomb magazine unit and an actuating unit that will permit the controlled sequential delivery of the individual simulated bombs through an opening in the housing unit.

In addition the actuating unit is constructed so as to insure that only a single simulated bomb can be released from the housing unit at a time.

As will be explained in greater detail further on in the specification, this paint ball drop system can be easily incorporated into any of the larger scale radio controlled airplane models to provide the R/C enthusiast with a clean, simple, and efficient aerial bomb delivery system.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a cut-away perspective view of the paint ball delivery system installed in a radio controlled aircraft;

FIG. 2 is an isolated perspective view of the paint ball delivery system;

FIG. 3 is an enlarged detail view of the actuating unit of the delivery system; and, FIG. 4 is an enlarged detail view of the paint ball magazine.

BEST MODE FOR CARRYING OUT THE INVENTION

As can be seen by reference to the drawings, and in particular to FIG. 1, the paint ball delivery system that forms the basis of the present invention is designated generally by the reference numeral (10). In addition this delivery system (10) is specifically designed to be incorporated into the fuselage (101) of a radio controlled aircraft (100).

As shown in FIG. 2, the paint ball delivery system that forms the basis of the present invention comprises in general: a housing unit (11) equipped with a magazine unit (12) which delivers simulated bombs to an actuator unit (13) which releases the simulated bombs from the housing unit (11) in a controlled fashion. These units will now be described in seriatim fashion.

As can be seen by reference to FIGS. 2 and 3, the housing unit (11) comprises a generally rigid lightweight housing member (20) having: an upper lateral bore (21) which extends into the housing member (20) from one side; a lower enlarged lateral bore (22) which extends into the housing member (20) from the other side; and, a vertical bore (23) which extends from the bottom of the housing member (20) and intersects both of the upper and lower lateral bores (21) and (22) for reasons that will be explained presently.

Turning now to FIGS. 2 and 4, it can be seen that the magazine unit (12) comprises an elongated and transparent, hollow tubular magazine member (30) having: a closed outboard end (31); an open inboard end (32); and, an enlarged aperture (33) disposed proximate to its inboard end (32).

In addition the inboard end (32) of the magazine member (30) is dimensioned to be snugly yet releasably received in the upper bore (21) of the housing member (20); wherein, the enlarged aperture (33) in the side of the magazine member is dimensioned to be aligned with the vertical bore (23) in the housing member (20) to allow passage of simulated bombs (50) from the magazine member (30) through the housing member (20).

At this juncture it should be noted that while the preferred embodiment of the invention contemplates that the simulated bombs (50) will comprise commercially available paint balls (51) designed to be propelled from pressurized guns; this invention also contemplates that the simulated bombs (50) can be fabricated from any suitable generally spherical deformable and rupturable membrane filled with either a powdered or liquid marking medium.

Turning now to FIGS. 2 and 3 it can be seen that the actuating unit (13) comprises a servo motor (40) secured to the housing member (20) an provided with a rotatable generally cylindrical servo-actuator member (41) which extends into the lower actuator bore (22) in the housing member (20); and which has an arcuately reduced central portion (42), whose purpose and function will be described next.

As can be seen particularly by reference to FIG. 3, the reduced central portion (42) of the servo-actuator (41) is dimensioned to both receive the lower portion of a gravity fed simulated bomb (50) and to at least partially and temporarily obstruct the passage of the simulated bomb (50) through the vertical bore (23) of the housing member until the servo-motor (40) is energized.

Once the R/C enthusiast energizes the radio controlled servo-motor (40) in a well recognized fashion the servo-actuator (41) will rotate causing the simulated bomb to be compressed between the reduced central portion (42) of the servo-actuator and the adjacent wall of the vertical bore (23) until the simulated bomb (50) is forced past the obstruction in the bore (23) and falls by gravity through the bore opening.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A delivery system for simulated bombs to be incorporated into the fuselage of a radio controlled airplane; wherein, the delivery system comprises:

a housing member disposed in said airplane and provided with an upper lateral bore and a vertical bore which extends from the bottom of the housing member and intersects and is in communication with the upper lateral bore a magazine unit operatively associated with said housing member and including a generally hollow tubular magazine member having a closed end and an open end; wherein, the open end is dimensioned to be received in said upper lateral bore a plurality of generally spherical simulated bomb members dimensioned to be received in said tubular magazine member, and to pass by gravity through the vertical bore in the housing member; and servo-controlled actuator means operatively associated with said vertical bore for controlling the sequential passage of said simulated balls through the vertical bore.

2. The delivery system as in claim 1; wherein, said simulated bomb members comprise a deformable rupturable membrane that envelopes a marking medium.

3. The delivery system as in claim 1; wherein, said simulated bomb members comprise paint balls.

4. The delivery system as in claim 1; wherein, said servo-controlled actuating means comprises:

a servo-motor secured to the housing member; wherein, the housing member is further provided with a lower lateral bore which intersects with the vertical bore; and, the servo-motor is further provided with a servo-actuator member which extends into and at least partially obstructs said vertical bore.

5. The delivery system as in claim 2; wherein one end of said magazine member is provided with an enlarged aperture that is in open communication with the vertical bore in said housing member.

6. The delivery system as in claim 5; wherein, said magazine member is transparent.

* * * * *